3,452,101
PHENOXY BIS(PHENYL MERCAPTO)BENZENES
John Robert Campbell, Tarkio, Mo., assignor to Monsanto Company, St. Louis, Mo., a corporation of Delaware
No Drawing. Application Apr. 22, 1965, Ser. No. 450,198, which is a continuation-in-part of application Ser. No. 379,708, July 1, 1964. Divided and this application Mar. 20, 1967, Ser. No. 642,265
Int. Cl. C07c *149/08;* C10m *3/32;* C09k *3/02*
U.S. Cl. 260—609                                    4 Claims

ABSTRACT OF THE DISCLOSURE

Certain tris-substituted mixed polyphenyl ethers-thioethers, containing one ether linkage and two thioether linkages, which are useful as functional fluids.

---

This application is a division of application Ser. No. 450,198, filed Apr. 22, 1965, which in turn is a continuation-in-part of application Ser. No. 379,708, filed July 1, 1964, now abandoned.

This invention relates to mixed polyphenyl ethers-thioethers having four, five or six aromatic groups containing at least two sulfur linkages. These classes of ether-thioethers can be represented by the structures (A) R—S$(R_1$—Y$)_2$R where R is a phenyl group, $R_1$ is a phenylene group and Y is selected from O and S but one of the Y's is S and one of the Y's is O;

(B) R$(Y$—$R_1)_3$Y—R where R, $R_1$ and Y have their aforedescribed significance and one to two of the Y's are O;

(C) R$(Y$—$R_1)_4$Y—R where R, $R_1$ and Y have their aforedescribed significance and one to three of the Y's are O; and (D) 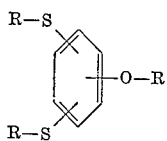

where R has the aforedescribed significance.

The compounds of this invention are useful as functional fluids of wide temperature ranges of the order of 0° F. to about 650° F. and in various applications, such as for force transmission fluids for the transmission of pressure, power or torque in fluid pressure or torque actuated mechanisms. Specific examples of such uses are the hydraulic fluids used to transmit fluid pressure to the ram cylinder of hydraulic presses, devices for the absorption and dissipation of energy, such as shock absorbers or recoil mechanisms or the transmission of torque through torque converter type fluid couplings. The compounds of this invention can also be used as damping fluids which are the liquid compositions used for damping mechanical vibrations or resisting other rapid mechanical movements. The compounds of this invention are also suitable for use as lubricants between relatively moving mechanical parts, as bases for synthetic greases, as nuclear reactor coolants, as vacuum pump fluids, as dielectrics, and as the liquid materials in the filters in air conditioning systems. They are particularly well suited for cooling and lubricating gears and bearings in jet engines.

When used as functional fluids, the compounds of this invention can be used per se or in mixtures with other compounds of this invention or in mixtures with polyphenyl ethers and/or polyphenyl thioethers or esters, especially where the instant compounds have relatively high crystallizing or melting points. The compounds of this invention can also be used in combination with various addition agents, particularly when used as hydraulic fluids or synthetic lubricants, such as oxidation inhibitors, rust and corrosion inhibitors, antifoaming agents, detergents, viscosity index improvers and the like.

Of the above-represented compounds those of structure (A) are preferred because their physical properties, especially low crystallizing points, make them usable in a wider number of the aforedescribed uses. Also, those compounds containing 50% or more meta linkages are preferred because of their lower crystallizing points.

The new compounds of this invention can be prepared by reacting an alkali metal salt of a thiophenol with a suitable halide in a suitable carboxamide solvent, such as N,N' - dimethylacetamide or N - methyl-2-pyrrolidone at temperatures of the order of 100° C.–250° C., but preferably 140° C.–200° C. Some of the instant compounds can also be prepared by the Ullmann synthesis by reacting an alkali metal phenate and a suitable halide in the presence of copper at temperatures of the order of 180° C.–260° C.

The preparation of typical compounds of this invention is illustrated by the following non-limiting examples.

Example 1

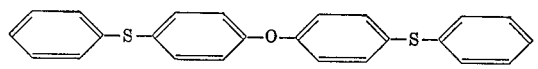

Into a suitable reaction vessel fitted with agitation means, means for measuring reaction mass temperatures and vapor temperatures, heating means, reactant and product inlets and outlets and also fitted with a reflux condenser, there was charged a mixture of 44 grams of thiophenol and 26 grams of 86% potassium hydroxide in 150 ml. of dimethylacetamide. The mixture was heated to obtain the potassium salt of thiophenol and to drive off water of reaction. The mixture was cooled to about 120° C. and 57.3 grams of bis(p-bromophenyl) ether was charged and the resulting mixture heated at 165° C.–170° C. for about 14 hours. The reaction mass was then allowed to cool to room temperature and then washed with 200 ml. of 12.5% sodium hydroxide. The organic layer was then separated, diluted with benzene, then washed with water and dried under vacuum. The residue solidified and was crystallized from an isopropanolbenzene mixture to give 47.3 grams of white crystals which melt at approximately 82° C.–84° C. The product, 4,4'-bis(phenylmercapto)diphenyl ether, i.e., bis(p-phenylmercaptophenyl) ether, analyzed 16.9% sulfur (theory, 16.59%).

Example 2

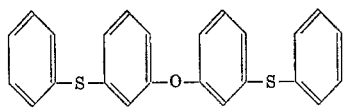

In the manner of Example 1, 44.0 grams of 85.4% potassium hydroxide, 74.6 grams of thiophenol and 62.9 grams of bis(m-chlorophenyl) ether were reacted in 425 ml. of dimethylacetamide at a temperature in the range of 150° C.–155° C. to provide 3,3'-bis(phenylmercapto)-diphenyl ether, i.e., bis(m-phenylmercaptophenyl) ether, a mobile, colorless liquid which had a boiling range of 237° C.–242° C. at 0.4 mm. of mercury.

Example 3

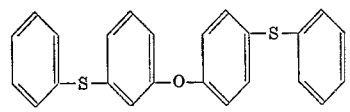

Into a suitable reaction vessel as previously described there was charged 132 grams of 85% potassium hydroxide and 1000 ml. of dimethylacetamide. After heating the resulting mixture to about 90° C., there was added over a period of about 30 minutes 222 grams of thiophenol and the resulting mixture was then heated to 170° C. to remove low boiling material and then cooled to 160° C. Then, over a period of about 30 minutes, there was charged 255 grams of 3,4'-dichlorodiphenyl ether. The reaction mass was then heated at reflux for about 10 hours, after which dimethylacetamide was stripped and the residue washed twice with water and the water washes extracted with toluene. Thereafter, the toluene was stripped and the remaining product fractionated to give 3,4'-bis(phenylmercapto)diphenyl ether, i.e., m-phenylmercaptophenyl p-phenylmercaptophenyl ether which had a boiling range of 250° C.–254° C. at 0.3 mm. of mercury. Analysis of the product showed that it contained 16.5% sulfur (theory, 16.58%). The thus prepared polyphenyl ether-thioether had a melting point of 73.2° C.–73.6° C.

Example 4

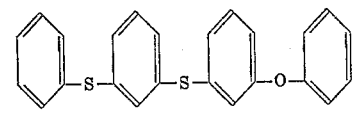

Into a suitable reaction vessel there was charged 14 ml. of water and 70 grams of 85% potassium hydroxide and the resulting mixture was heated to 110° C., after which there was added 125 grams of phenol. Then, 15 ml. of toluene was added and the water removed by azeotropic distillation until a pot temperature of 265° C. was reached. The reaction mass was then cooled to 240° C. and 2 grams of cupric chloride was added. The reaction mass was then heated slightly at 329 grams of m-(m-phenylmercaptophenylmercapto)phenyl chloride was slowly added. The reaction mass was then heated at 255° C.–260° C. for about 6 hours and quenched. An aqueous layer was then separated, extracted with toluene and the extract combined with the organic layer. The organic material was extracted with water, filtered, and the toluene stripped to give 233 grams of 3-phenylmercapto-3'-phenoxydiphenyl sulfide, i.e., m-phenylmercaptophenyl m-phenoxyphenyl sulfide, which had a boiling range of 236° C.–240° C. at 0.1 mm. of mercury.

Example 5

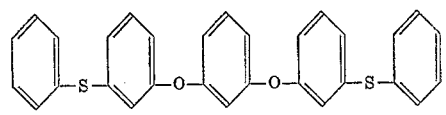

Into a suitable reaction vessel there was charged a mixture of 55.1 grams of thiophenol, 32.9 grams of 85.2% potassium hydroxide and 200 ml. of N-methylpyrrolidone. The air in the vessel was then replaced with nitrogen (which was maintained until the preparation was completed) and the reaction mass heated to 214° C. to form the potassium thiophenate and remove water. Then, 66.2 grams of m-bis(m-chlorophenoxy)benzene was charged and the resulting mixture was heated at reflux for about 24 hours. The solvent was then stripped to a pot temperature of 240° C. and the residue quenched with 150 grams of 2% sodium hydroxide. After cooling the quenched residue to about 70° C. and allowing an aqueous and an organic layer to separate, the upper aqueous layer was separated, extracted with benzene and the benzene solutions combined with the organic layer. The organic material was then extracted with water, filtered, stripped of benzene and distilled under vacuum to give 34.7 grams of m-bis(m-phenylmercaptophenoxy)benzene which had a boiling range of 287° C.–297° C. at 0.5 mm. of mercury, an index of refraction, $n_D^{25}$, of 1.6729 and viscosities, cs., of 284.4 at 100° F. and 12.68 at 210° F.

Example 6

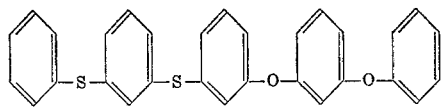

Into a suitable reaction vessel fitted with a Dean-Stark trap there was charged 67.0 grams of m-phenoxyphenol and 22.1 grams of 85.2% potassium hydroxide. The mixture was heated to 140° C. to dissolve the caustic, after which 15 ml. of toluene was charged. Heating was continued to 245° C. to remove water with distilling toluene and the latter in turn was separated in the trap and returned to the reaction vessel. After removing about 7 ml. of water the toluene was stripped off and 0.5 gram of cupric chloride and 82.2 grams of m-(m-phenylmercaptophenylmercapto)phenyl chloride were added. The reaction mass was then heated at about 200° C. for about 16 hours, cooled and then quenched with 150 grams of 4% sodium hydroxide. An aqueous layer and an organic layer were separated and worked up as in Example 5. The washed crude product was then fractionated to give the desired product, 3-(m-phenylmercaptophenylmercapto)-3'-phenoxydiphenyl ether which had a boiling range of 279° C.–288° C. at 0.6 mm. of mercury, an index of refraction, $n_D^{25}$, of 1.6751 and viscosities, cs., of 275.3 at 100° F. and 11.95 at 210° F.

Example 7

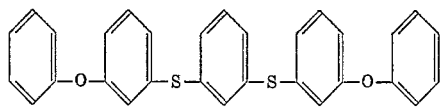

In the manner of Example 6, 47 grams of phenol, 28.6 grams of 87% potassium hydroxide, 0.7 gram of cupric chloride and 72.7 grams of m-bis(m-chlorophenylmercapto)benzene were utilized to provide 60.3 grams of m-bis(m-phenoxyphenylmercapto)benzene which had a boiling range of 280° C.–283° C. at 0.5 mm. of mercury, an index of refraction, $n_D^{25}$, of 1.6748 and viscosities, cs., of 357.2 at 100° F. and 12.53 at 210° F.

Example 8

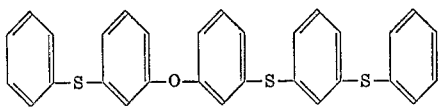

Into a suitable reaction vessel there was charged 34.5 grams of 87% potassium hydroxy, 23 grams of water, and 111.3 grams of m-phenylmercaptophenol. The resulting mixture was heated at reduced pressure to remove the water and complete salt formation. Vacuum in the reaction vessel was then displaced with nitrogen, after which 1.0 gram of cupric chloride was charged. Then, 180.9 grams of m-(m-phenylmercaptophenylmercapto)phenyl chloride was added slowly at 170° C.–185° C., after which the reaction mass was heated at about 200° C. for about eight hours. The reaction mass was then cooled and the organic products obtained by quenching the reaction mass with water, followed by separation of the organic layer and the washing thereof. After drying, the organic portion obtained was fractionated and the desired fraction treated with alumina and filtered. The product, 3-phenylmercapto - 3' - (m-phenylmercaptophenylmercapto)diphenyl ether, had a boiling range of 268° C.–289° C. at 0.08 mm. of mercury, an index of refraction, $n_D^{25}$ of 1.6945 and viscosities, cs., of 266.7 at 100° F. and 12.37 at 210° F.

Example 9

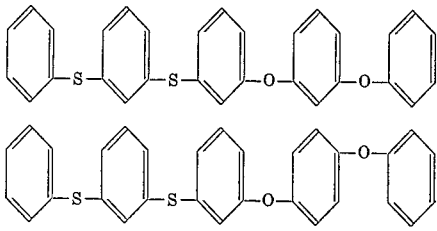

Into a suitable reaction vessel there was charged 102.4 grams of m-phenoxyphenol and 102.4 grams of p-phenoxyphenol followed by a solution of 69.0 grams of 87% potassium hydroxide in 45 grams of water. The mixture was heated to remove water, after which 1.75 grams of anhydrous cupric chloride and 328.9 grams of 3-phenylmercapto-3'-chlorodiphenyl sulfide were charged at 174° C.–187° C. The reaction mass was then heated at temperatures of the order of 200° C. for about seven hours and cooled. The organic product was separated and washed as in the previous examples, after which it was fractionated to provide a mixture of 3-phenylmercapto-3' - (m-phenoxyphenoxy)diphenyl sulfide and 3-phenylmercapto - 3' - (p - phenoxyphenoxy)diphenyl sulfide, which had a boiling range of 266° C.–288° C. at 0.08 mm. of mercury, an index of refraction, $n_D^{25}$, of 1.6751, and viscosities, cs., of 324.8 at 100° F. and 12.88 at 210° F.

Example 10

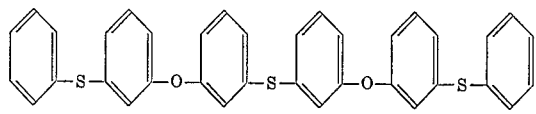

Into a suitable reaction vessel containing a nitrogen atmosphere there was charged 81.3 grams of thiophenol, 30 grams of sodium hydroxide and 325 ml. of N-methylpyrrolidone. The resulting mixture was dehydrated and then 130 grams of bis[m-(m-chlorophenoxy)phenyl] sulfide was charged. The resulting mixture was heated at reflux for about 12 hours, after which the organic portion was obtained by the previously described procedure of water quenching, benzene extraction, water washing and distillation of benzene. The crude organic product was then fractionated to provide bis[m-(m-phenylmercaptophenoxy)phenyl] sulfide which had a boiling range of 351° C.–355° C. at 0.6 mm. of mercury, an index of refraction, $n_D^{25}$, of 1.6901 and viscosities, cs., of 1700 at 100° F. and 25.06 at 210° F.

Example 11

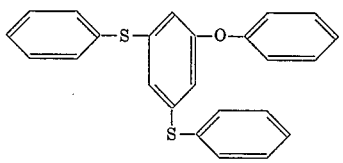

(a) Into a suitable reaction vessel there was charged about 265 grams of sodium benzenethiolate in about 600 ml. of N-methylpyrrolidone. To this mixture there was added about 181 grams of 1,3,5-trichlorobenzene. The resulting mixture was heated at reflux for about 8 hours, after which the organic layer was obtained by the usual procedure of water quenching, benzene extraction, washing and distillation.

(b) In another flask there was prepared a solution of about 133 grams of potassium phenate in phenol.

(c) The products from steps (a) and (b) were then combined, a small amount of cupric chloride was added and the resulting mixture heated at about 220° C. for about 8 hours, after which the desired product, 1-phenoxy-3,5-bisphenylmercaptobenzene, was obtained in the usual manner.

In a similar manner other compounds of this invention can be prepared. Examples of such compounds are as follows:

o-Phenylmercapto-p'-phenoxydiphenyl sulfide
o-Phenylmercapto-m'-phenoxydiphenyl sulfide
o-Phenoxy-m'-phenylmercaptodiphenyl sulfide
m-Phenoxy-p'-phenylmercaptodiphenyl sulfide
o-Phenoxy-p'-phenylmercaptodiphenyl sulfide
p-Phenoxy-p'-phenylmercaptodiphenyl sulfide
o-Phenoxy-o'-phenylmercaptodiphenyl sulfide
o,o'-Bis(phenylmercapto)diphenyl ether
o-Phenylmercapto-m-phenylmercaptodiphenyl ether
o-Phenylmercapto-p-phenylmercaptodiphenyl ether
m-(m-Phenylmercaptophenylmercapto(m-phenoxyphenylmercapto)-benzene
[m-(m-Phenylmercaptophenylmercapto)phenyl] [m-(m-phenoxyphenylmercapto)phenyl] sulfide
3-(m-phenylmercaptophenylmercapto)-3'-m-phenylmercaptophenoxy)diphenyl sulfide
3,3'-bis(m-phenylmercaptophenylmercapto)diphenyl ether
3-(m-phenylmercaptophenylmercapto)-3'-(m-phenoxyphenoxy)-diphenyl sulfide
4-(m-phenylmercaptophenylmercapto)-4'-(m-phenylmercaptophenoxy)diphenyl ether
3-(m-phenylmercaptophenylmercapto)-3'-(m-phenoxyphenylmercapto)diphenyl ether
4,4'-bis(m-phenylmercaptophenoxy)diphenyl sulfide
4,4'-bis(m-phenoxyphenylmercapto)diphenyl sulfide
3-(m-phenoxyphenylmercapto)-3'-(m-phenylmercaptophenoxy)diphenyl sulfide
3,3'-bis(m-phenylmercaptophenoxy)diphenyl ether
4-(m-phenylmercaptophenylmercapto)-4'-(m-phenoxyphenoxy)diphenyl ether
3-(p-phenylmercaptophenoxy)-3'-(p-phenoxyphenoxy)-diphenyl sulfide
3-(m-phenylmercaptophenoxy)-3'-(m-phenoxyphenylmercapto)diphenyl ether
3,3'-bis(m-phenoxyphenylmercapto)diphenyl ether and
3-(m-phenoxyphenylmercapto)-3'-(m-phenoxyphenoxy)-diphenyl sulfide.

In addition to the foregoing compounds, the phenyl and phenylene groups of such compounds can contain substituents, such as alkyl of 1 to 4 carbon atoms, alkoxy of 1 to 4 carbon atoms, halogen, phenyl and perfluoroalkyl of 1 to 4 carbon atoms. Examples of such compounds are as follows:

4,4'-bis(m-tolymercapto)diphenyl ether
3,3'-bis(m-tolymercapto)diphenyl ether
2,4'-bis(m-tolylmercapto)diphenyl ether
3,4'-bis(m-tolylmercapto)diphenyl ether
3,3'-bis(p-tolylmercapto)diphenyl ether
3,3'-bis(xylylmercapto)diphenyl ether
4,4'-bis(xylylmercapto)diphenyl ether
3,4'-bis(xylylmercapto)diphenyl ether
3,4'-bis(m-isopropylphenylmercapto)diphenyl ether
3,3'-bis(m-isopropylphenylmercapto)diphenyl ether
2,4'-bis(m-isopropylphenylmercapto)diphenyl ether
3,4'-bis(p-tert-butylphenylmercapto)diphenyl ether
4,4'-bis(p-tert-butylphenylmercapto)diphenyl ether
3,3'-bis(p-tert-butylphenylmercapto)diphenyl ether 3,3′-bis(2,4-di-tert-butylphenylmercapto)diphenyl ether
3,3′-bis(3-chlorophenylmercapto)diphenyl ether
4,4′-bis(3-chlorophenylmercapto)diphenyl ether
3,3′-bis(m-trifluoromethylphenylmercapto)diphenyl ether
4,4′-bis(m-trifluoromethylphenylmercapto)diphenyl ether
3,4′-bis(m-trifluoromethylphenylmercapto)diphenyl ether
2,3′-bis(m-trifluoromethylphenylmercapto)diphenyl ether
3,3′-bis(p-trifluoromethylphenylmercapto)diphenyl ether
3,3′-bis(o-trifluoromethylphenylmercapto)diphenyl ether
3,3-bis(m-methoxyphenylmercapto)diphenyl ether
3,4′-bis(m-isopropoxyphenylmercapto)diphenyl ether
3,4′-bis(m-perfluorobutylphenylmercapto)diphenyl ether
2-(m-tolyloxy)-2′-phenylmercaptodiphenyl sulfide
2-(p-tolyloxy)-3′-phenylmercaptodiphenyl sulfide
2-(o-tolyloxy)-4′-phenylmercaptodiphenyl sulfide
3-(m-tolyloxy)-3′-phenylmercaptodiphenyl sulfide
3-(m-tolyloxy)4′-phenylmercaptodiphenyl sulfide
4-(m-tolyloxy)-4′-phenylmercaptodiphenyl sulfide
3-xylyloxy-4′-phenylmercaptodiphenyl sulfide
3-xylyloxy-3′-phenylmercaptodiphenyl sulfide
3-phenoxy-3′-(m-tolylmercapto)diphenyl sulfide
3-phenoxy-4′-(m-tolylmercapto)diphenyl sulfide
2-phenoxy-3′-(p-tolylmercapto)diphenyl sulfide
3-phenoxy-4′-(m-isopropylphenylmercapto)diphenyl sulfide
3-phenoxy-3′-(m-isopropylphenylmercapto)diphenyl sulfide
3-m-toloxy-3′-(m-isopropylphenylmercapto)diphenyl sulfide
4-(m-trifluoromethylphenoxy)-4′-phenylmercaptodiphenyl sulfide
3-(m-trifluoromethylphenoxy)-4′-phenylmercaptodiphenyl sulfide
2-(m-trifluoromethylphenoxy)-3′-phenylmercaptodiphenyl sulfide
3-(m-trifluoromethylphenoxy)-3′-phenylmercaptodiphenyl sulfide
3-(p-chlorophenoxy)-3′-phenylmercaptodiphenyl sulfide
3-(m-bromophenoxy)-4′-phenylmercaptodiphenyl sulfide
Bis[m-(m-chlorophenoxy)phenyl] sulfide
m-Bis[3-(p-methylphenylmercapto)phenoxy]benzene
m-Bis[3-(m-trifluoromethylphenoxy)phenylmercapto]benzene
m-Bis[3-(m-bromophenoxy)phenylmercapto]benzene
3,3′-bis[m-(p-methylphenylmercapto)phenoxy]diphenyl sulfide
3,4′-bis[m-(p-methylphenylmercapto)phenoxy]diphenyl sulfide
3-(p-xenyloxy)-3′-phenylmercapto diphenyl sulfide
3,3′-bis(m-phenylmercaptophenoxy) biphenyl and
1-(o-xenyloxy)-3,5-bisphenylmercaptobenzene While this invention has been described with respect to various specific examples and embodiments, it is understood that the invention is not limited thereto and that it can be variously practiced within the scope of the following claims.

The embodiments of the invention in which an exclusive property or privilege is claimed are defined as follows:

1. A compound represented by the structure

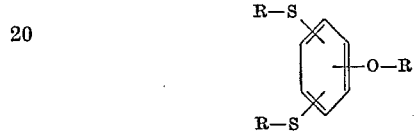

where R is selected from the group consisting of phenyl and substituted phenyl in which the substituents on said substituted phenyl are selected from the group consisting of alkyl of 1 to 4 carbon atoms, alkoxy of 1 to 4 carbon atoms, halogen and perfluoroalkyl of 1 to 4 carbon atoms.
2. A compound of claim 1 where R is phenyl.
3. 1-phenoxy-3,5-bisphenylmercaptobenzene.
4. 1-phenoxy-2,4-bisphenylmercaptobenzene.

References Cited

UNITED STATES PATENTS 3,102,916   9/1963   Reifschneider _____ 260—609

CHARLES B. PARKER, *Primary Examiner.*

D. R. PHILLIPS, *Assistant Examiner.*

U.S. Cl. X.R.

252—45, 67, 73